Sept. 17, 1963　　　　R. DYCK　　　　3,103,706
PUSH OVER GARAGE
Filed April 4, 1962
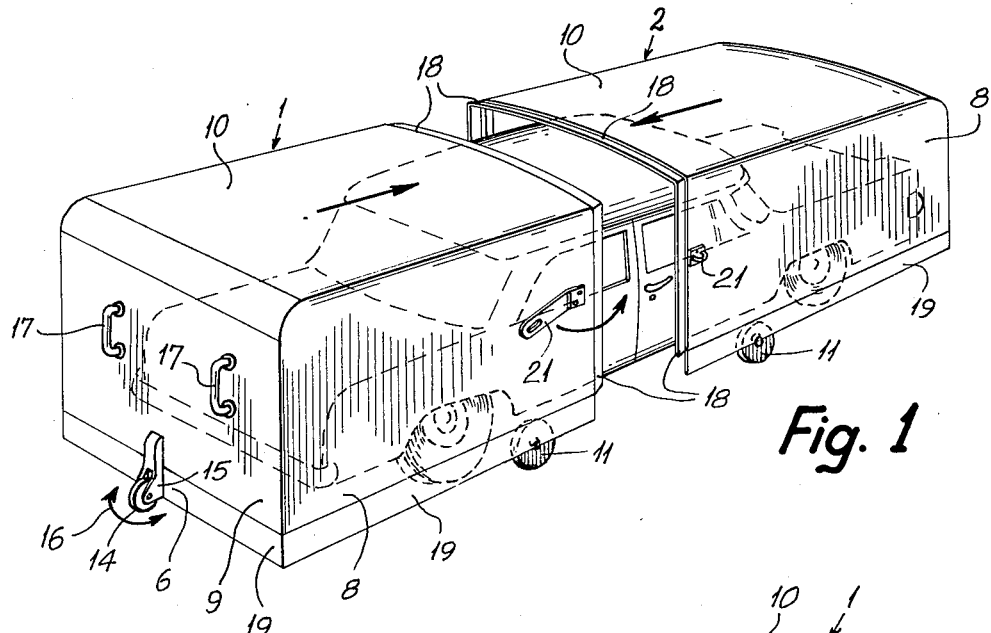
Fig. 1
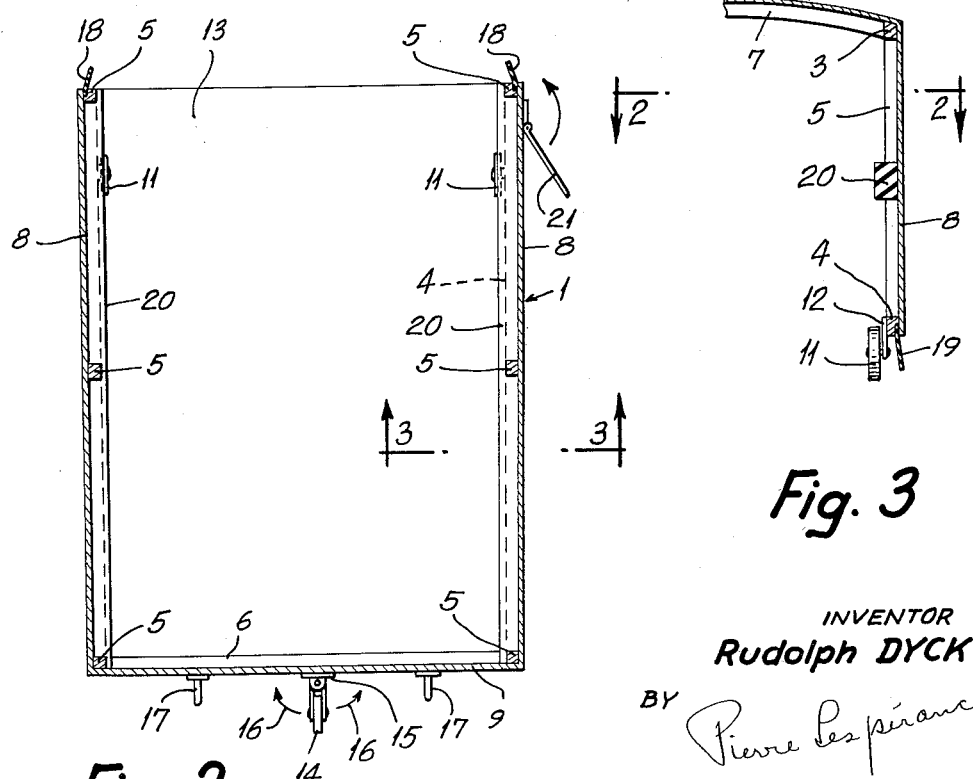
Fig. 2
Fig. 3
INVENTOR
Rudolph DYCK
BY Pierre Lespérance
PATENT AGENT 3,103,706
PUSH OVER GARAGE
Rudolph Dyck, 320 Prince Albert St., Westmount,
Quebec, Canada
Filed Apr. 4, 1962, Ser. No. 185,152
1 Claim. (Cl. 20—1.13)

The present invention relates to means for sheltering automobiles and the like against weather.

Due to the considerable increase of motor vehicles, and especially passenger cars, several car owners have no facilities for sheltering their cars against weather when not in use, and have to park them in the open in driveways, along street curbs, and the like.

The general object of the present invention resides therefore in the provision of a movable garage, or shelter for passenger cars, which enables to protect the car against weather, when the car is parked in the open, and which may even advantageously replace stationary garage structures.

A more specific object of the present invention resides in the provision of a movable garage of the character described made of two sections mounted on wheels and of light weight construction for ease in manually pushing the sections over the parked car to form a completely closed shelter for the car.

Another object of the present invention resides in the provision of a push over garage of the character described which is of relatively inexpensive and simple construction, which can be easily moved about in any desired direction, and which has sealing means at the junction of the two sections which make the shelter weatherproof when the sections are closed.

The foregoing and other important objects of the present invention will become more apparent during the following disclosure and by referring to the drawings, in which:

FIGURE 1 is a perspective view of the two sections of the push over garage in partially opened position and also showing a passenger car located within the garage;

FIGURE 2 is a plan section of one of the two sections of the garage, said plan section being taken along line 2—2 of FIGURE 3; and FIGURE 3 is a partial cross-section taken along line 3—3 of FIGURE 2.

Referring now more particularly to the drawings in which like reference characters indicate like elements throughout, the shelter of the present invention is made of two sections 1 and 2 which are mounted on wheels and are arranged to be pushed over the two ends of a car, and joined together at approximately the center of the car, so as to form a complete enclosure for the latter.

Each section comprises a frame consisting of top and bottom longitudinal lateral members 3 and 4 interconnected by spaced uprights 5, the systems of longitudinal beam members 3, 4 and uprights 5 on both sides of the sections are interconnected at the outer end of the section by a transverse horizontal bottom beam member 6 and by a slightly curved roof transverse beam member 7. Additional roof members 7 extend across the upper ends of the remaining uprights 5. Lateral longitudinally extending panels 8 are secured onto the outside of uprights 5 and beam members 3 and 4 to form the lateral walls of the section while an end panel 9 is secured to the outside of the outer pair of uprights 5 and beam members 6 to form the end wall of the sections, and a transversely curved roof panel 10 is secured to roof members 7. The junction of roof panel 10 with end wall 9 is preferably rounded as shown at 10'. Each section is provided with a pair of idle wheels 11 rotatably carried by brackets 12 which are secured to the lower longitudinal beams 4 near the opened end 13 of the garage section.

Each garage section has a caster wheel 14, the yoke of which is rotatably mounted in a bracket 15 which is secured to the center of the lower marginal portion of the end wall 9. Wheel 14 is pivotable in accordance with the double arrows 16. A pair of handles 17 are also secured to the end wall 9 at a level convenient for the operator.

Flexible sealing strips 18 made of rubber or the like, are arranged all around the opened end 13, being preferably secured to the uprights 5 at said end, and to the associated curved transverse roof strut 7. The sealing strips 18 at the opened ends 13 of the two sections are arranged to overlap each other when the two sections are brought into closed position, so as to form a weather tight joint. For this purpose, the sealing strips 18 of one section are slightly inclined inwardly, as shown in FIGURE 2, for engaging inwardly of the straight sealing strips of the other section.

Preferably, the idle wheels 11 and caster wheel 14 protrude downwardly from the lower edge of the walls of the garage section in order to leave a space between the ground and the lower edge of the section for escape of children which might be locked inside the garage. However, this space is preferably closed by flexible flaps 19 made of rubber or the like, which are secured at their upper edge to the lower edge of the wall panels 8 and 9. Flaps 19 while allowing escape of children serve not only to hide the contents of the closed garage from view, but also to prevent as much as possible entry of snow, rain, and also to prevent circulation of air inside the closed garage. Thus, in winter time, the engine of the car C parked inside the closed garage will cool off at a much slower rate, due to the insulating effect of the air entrapped within the garage.

In order to prevent scratching of the paint of the car C when the garage sections are pushed over the same, horizontally extending rubber bumpers 20 are secured to the inside face of lateral walls 8 at a suitable height above ground and protrude inwardly from the garage frame. These rubber bumpers 20 need not be very wide to prevent contact of the sides of the car C with the inner frame of the garage sections because it has been found that the variation of the height above ground of the zone of maximum width in different makes of cars is not very great.

The two garage sections are preferably provided on each side therof with latch members 21 adjacent the opened end 13 of the sections which are engageable and adapted to be locked by a padlock in order to prevent unauthorized opening of the garage. Thus, the garage sections in accordance with the invention, prevents theft of the car.

In the use of the invention, the two garage sections may be wheeled over the parked car and brought into closed position, or the car may be driven into an already positioned garage section and the other section then wheeled over the exposed part of the car. The two sections are then locked together by means of latches 21. The two sections of the garage can be easily displaced by hand and in any direction and can be easily stored in a driveway, yard, or the like when not in use.

In order to decrease the space occupied by the two sections when not in use, it is well within the spirit of the present invention to make one section of smaller cross-sectional area than the other section, so that the smaller size garage section will nest within the larger size garage section. That is the two sections will be in telescopic engagement when not in use.

In this latter case, only the larger section need be provided with sealing strips at the outer end 13 thereof which make sealing engagement with the outside face of the roof and side walls of the smaller size garage section.

While a preferred embodiment in accordance with the present invention has been illustrated and described, it is understood that various modifications may be resorted to without departing from the spirit and scope of the appended claim.

What I claim is:

A push over garage for motor vehicles, consisting of an enclosure made of two rigid elongated sections, each section comprising a roof, lateral walls, an end wall and open at its other end, said roof and walls being of rigid construction, idle wheels protruding from the lower edge of said lateral walls adjacent said open end and rotatable in planes parallel to said lateral walls, and a caster wheel protruding from the lower edge of said end wall, sealing strips protruding from the edge of said roof and lateral walls at the open end of each section, said two sections joined together at their open end with the sealing strips of one section overlapping the sealing strips of the other section, and means to retain said sections in joined position.

References Cited in the file of this patent

UNITED STATES PATENTS

| | | |
|---|---|---|
| 1,156,693 | Koger | Oct. 12, 1915 |
| 1,896,433 | Windeknecht | Feb. 7, 1933 |
| 2,606,057 | Johnson | Aug. 5, 1952 |
| 2,992,709 | McIntosh | July 18, 1961 |

FOREIGN PATENTS

| | | |
|---|---|---|
| 455,215 | Italy | 1950 |
| 864,958 | Great Britain | 1961 |